Oct. 5, 1943.    L. A. DUNAJEFF    2,330,815
AERIAL TORPEDO
Filed Jan. 31, 1939    3 Sheets-Sheet 1
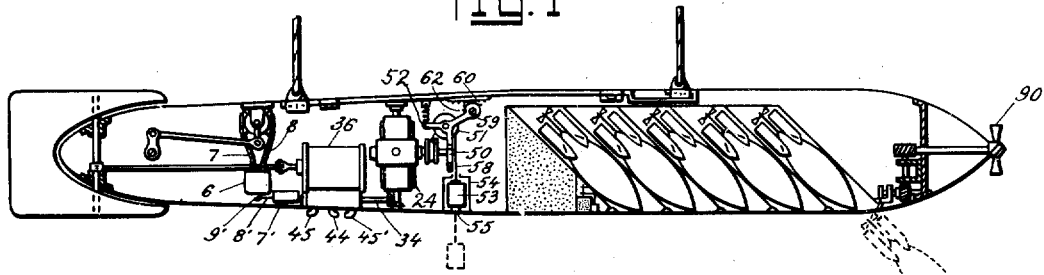
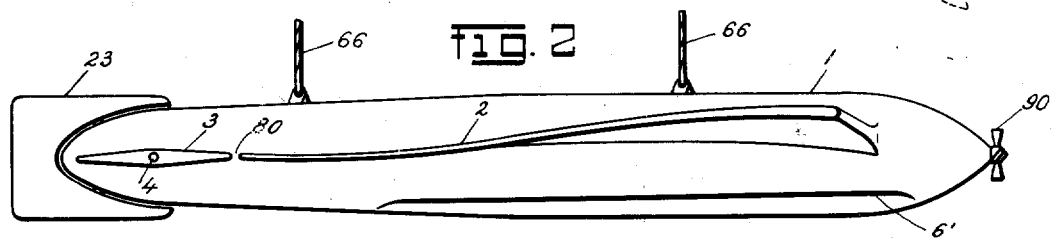
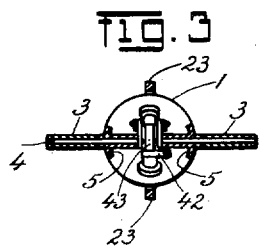 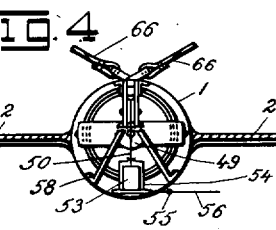 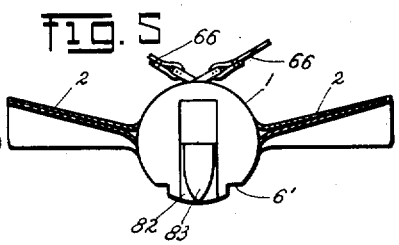
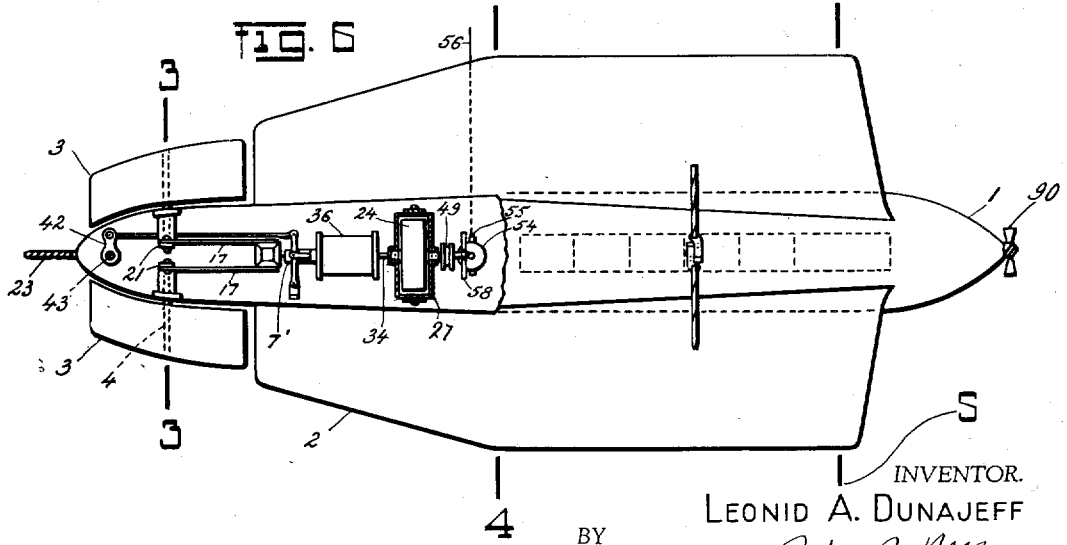
INVENTOR.
LEONID A. DUNAJEFF
BY John P. Mironow
ATTORNEY.

Oct. 5, 1943.  L. A. DUNAJEFF  2,330,815
AERIAL TORPEDO
Filed Jan. 31, 1939   3 Sheets-Sheet 2
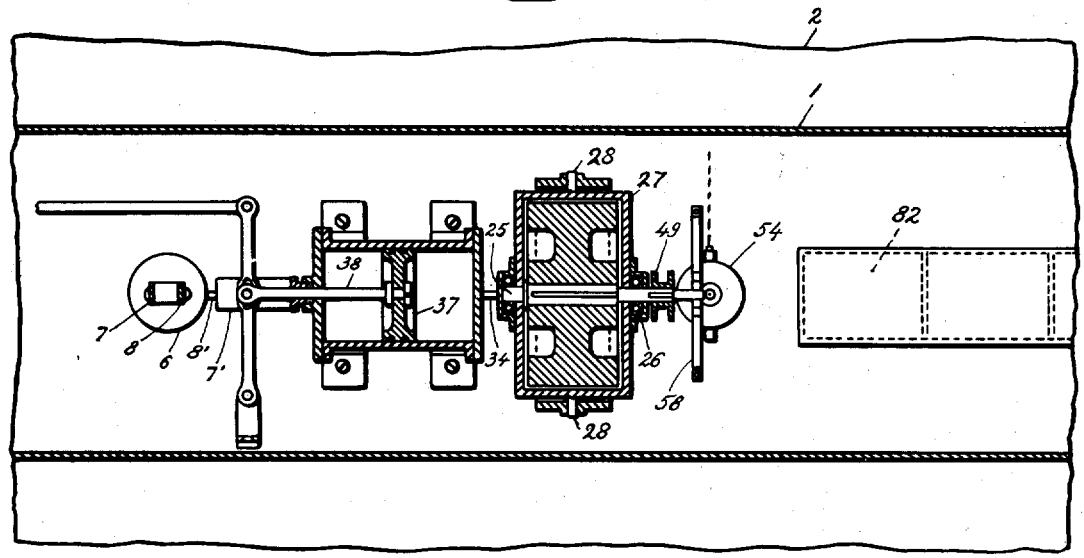
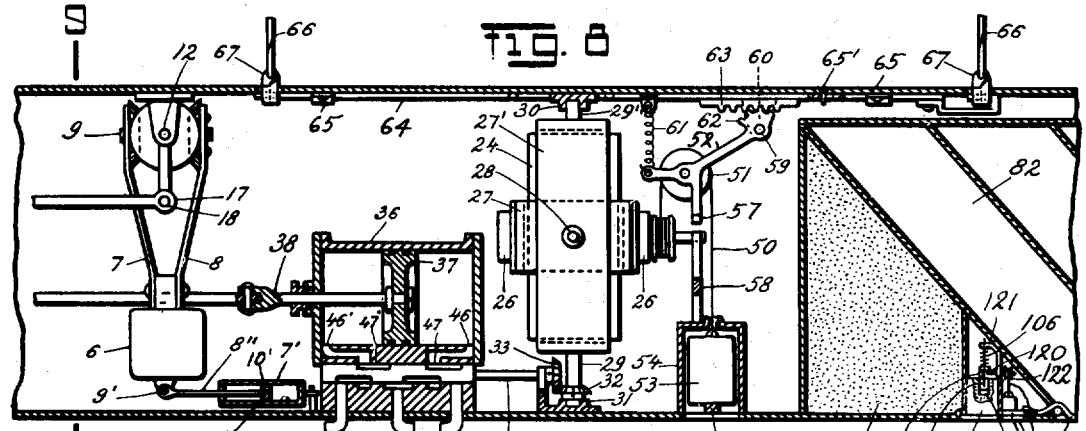
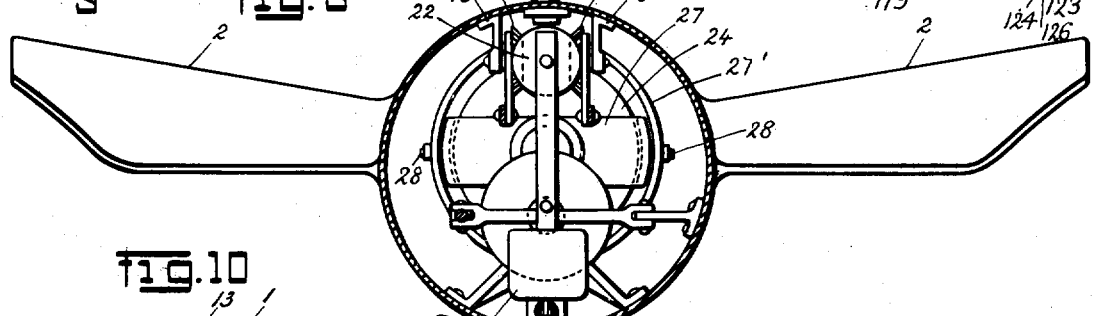
INVENTOR.
LEONID A. DUNAJEFF
BY John P. Nikonow
ATTORNEY.

Oct. 5, 1943.     L. A. DUNAJEFF     2,330,815
AERIAL TORPEDO
Filed Jan. 31, 1939     3 Sheets-Sheet 3
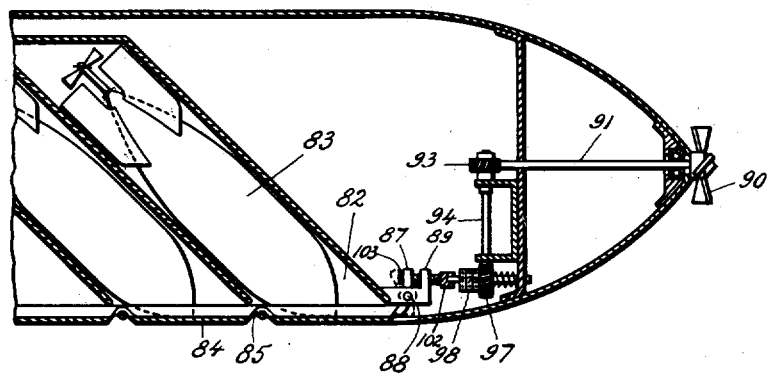
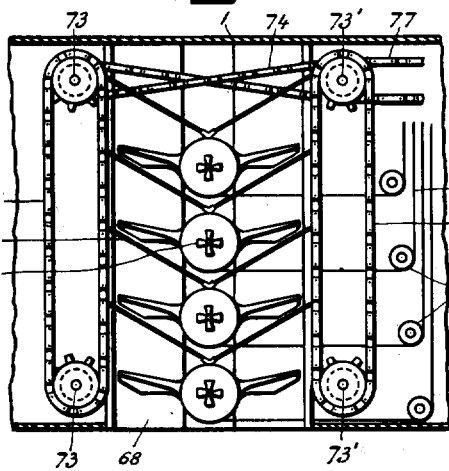
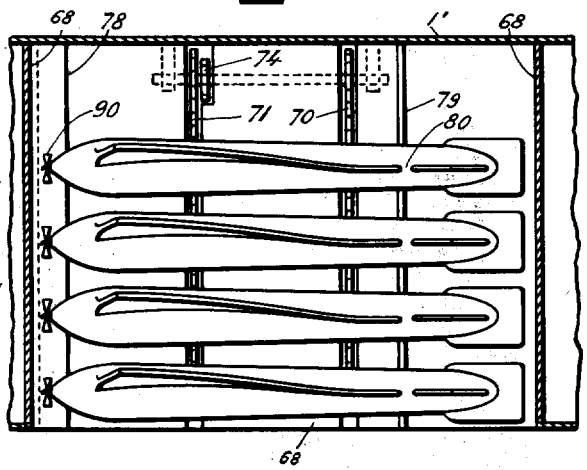
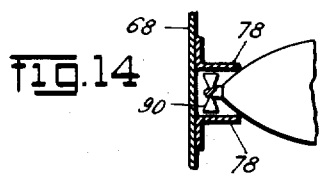
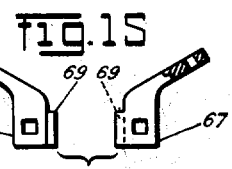
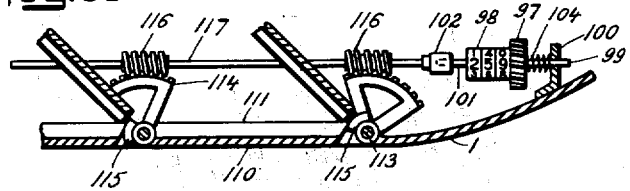
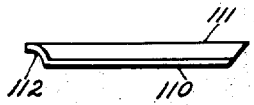
INVENTOR.
LEONID A. DUNAJEFF
BY John O. Nikonow
ATTORNEY.

Patented Oct. 5, 1943

2,330,815

UNITED STATES PATENT OFFICE 2,330,815

AERIAL TORPEDO

Leonid A. Dunajeff, New York, N. Y., assignor to Joseph Z. Dalinda, New York, N. Y.

Application January 31, 1939, Serial No. 253,744

5 Claims. (Cl. 89—1.5)

This invention relates to a new method of projecting gliding missiles, and to gliding missiles, torpedoes, or bombs, to be delivered from aircraft.

This is a continuation in part of my application Serial No. 209,898, filed May 20, 1938, Patent #2,258,281.

Ordinarily missiles when discharged from an airplane drop to the ground by force of gravity, describing a parabolic trajectory of a short range so that the aircraft must fly practically over the bombed objective.

My invention has for its main object to provide a method and means for bombing objects at much greater distances from the objectives than is possible with ordinary bombs through the use of specially constructed automatic aerial gliding torpedoes, or gliding carriers launched from airplanes flying at high altitudes. For this purpose, my carrier, or torpedo is so made that it will glide upon release from an airplane at a pre-determined angle of descent, at a substantially constant speed, thus radically differing from ordinary bombs. By selecting a suitable angle of descent, it is possible to control the distance which the torpedo or carrier will cover and to calculate the range for a given altitude and speed of the airplane, making the usual corrections for meteorological and other conditions, etc., accepted for artillery projectiles or for ordinary aerial bombs. This distance is proportional to the heighth at which the missile is launched and to the co-tangent of the angle of descent, assuming that the trajectory of descent is a substantially straight line. With a small angle of descent this distance can be made very large. It is evident that my aerial missile enables bombarding large objectives—such as military camps, airdromes, factories, cities, etc., from great distances.

Calculations show that it is possible to make my gliding torpedo, or carrier, with relatively narrow wings so that it can be conveniently held in the fuselage of an airplane to be launched at the desired moment.

My gliding carrier or torpedo can be made to carry a number of relatively small bombs with various types of explosives, smoke, incendiary, or gas bombs, shrapnel, etc., these bombs being automatically discharged from the torpedo, one after another, and even in different lateral directions, when the torpedo reaches its destination, or has flown a predetermined distance. For this purpose I provide a torpedo with a vane operating a revolution counter which can be set for a desired distance of flight. The counter, upon completion of this distance, releases the first bomb, the rest of the bombs being then successively discharged by the special mechanism.

Another object of my invention is to provide means in the torpedo for maintaining its correct angle of gliding descent. For this purpose I use a pendulum so connected with elevators or horizontal rudders that the torpedo is automatically maintained at the correct angle of inclination. For maintaining also the lateral balance, the pendulum is suspended with freedom of movement not only in longitudinal but also transverse direction with reference to the axis of the torpedo, and the elevators are connected so that they turn in different directions at the right and left side of the torpedo for correcting the horizontal or transverse alignment of the torpedo. Longitudinal deviations of the torpedo will cause the pendulum to move both right and left elevators in the same direction.

Another object of my invention is to provide means to keep the torpedo during its flight on the originally given course. For this purpose I provide the torpedo with my special gyroscopic mechanism connected with vertical rudders in such a manner that any deivation of the torpedo from the given direction will cause the gyroscope to operate the rudder thereby correcting the deviation.

Another object of my invention is to provide means for spinning the gyroscope when the torpedo is being launched. I accomplish this by providing a weight attached to one end of a flexible cord wound on a pulley on the extension of the gyroscope shaft. By manually releasing the weight, it is allowed to fall from the torpedo, carrying the cord and imparting rotation to the gyroscope until the cord is completely unwound from the pulley and falls away together with the weight. In order to release the torpedo at the exact moment when the cord is unwound, I provide a mechanism controlled by the tension of the cord so that when the tension is released the mechanism releases the torpedo for its flight.

The airplane must, of course, fly in the direction toward the objective at the time when the gyroscope is wound and the torpedo released.

The gyroscope may also be wound by any other suitable means, as, for instance, by a power take-off from the engine, or by an electric motor, but I prefer to utilize for this purpose the potential energy of my torpedo and its part as derived from the power expended by the airplane engine in lifting the missile to the high elevation. Instead of using a separate weight for this purpose, the energy of the torpedo itself can be utilized as disclosed in my copending application Serial No. 242,472, filed November 26, 1938.

Another object of my invention is to provide means to conserve the kinetic energy of the spinning gyroscope so that a relatively small gyroscope can be used to operate the rudder. For this purpose I provide an auxiliary mechanism interposed between the gyroscope and the rudder, or a relay, employing an external source of power for its operation. Such power is furnished by the air pressure in flight, using air intake and suction pipes of the Pitot type, so that air pressure can be utilized to provide compressed air for operating an auxiliary air motor or cylinder with a piston connected with the rudder, the gyroscope being used to control the air supply to the cylinder.

Another object of my invention is to provide means to explode the torpedo at a given point of its trajectory, or upon striking an object, when all the bombs are released, for which purpose I provide a charge of an explosive in the torpedo with a detonator acted upon by a striking pin operated by the mechanism which releases the last bomb.

My invention includes therefore a method for bombarding distant objectives from great distances by gliding torpedoes, or by delivering a plurality of bombs on a gliding aerial carrier.

It should be noted that the torpedo when released at a very high altitude in a rarefied air may begin its descent at a somewhat steeper angle but upon gaining speed, will assume its predetermined angle of descent.

Should the torpedo be upset by a gust of wind, etc., at the time of launching, it will right itself because of the arrangement of the center of gravity below its center of pressure, the gyroscope then will turn the torpedo in the desired direction of flight.

My invention is more fully described in the accompanying specification and drawings in which—

Fig. 1 is a sectional elevation of the torpedo.

Fig. 2 is an elevational outside view of the same.

Fig. 3 is a sectional view taken on the line 3—3 of Fig. 6.

Fig. 4 is a sectional view taken on the line 4—4 of Fig. 6.

Fig. 5 is a sectional view taken on the line 5—5 of Fig. 6.

Fig. 6 is a top plan view of the torpedo partly in section.

Fig. 7 is a sectional detail view of a gyroscope with the air cylinder.

Fig. 8 is a fractional vertical sectional view of the middle portion of the torpedo, showing in detail the pendulum and the outside view of the gyroscope with the air cylinder.

Fig. 9 is a sectional view taken on the line 9—9 of Fig. 8.

Fig. 10 is a fractional sectional view of the pendulum gears.

Fig. 11 is a detail view of a bomb releasing mechanism.

Fig. 12 is a fractional transverse sectional view of an arrangement for supporting a number of torpedoes in an airplane.

Fig. 13 is a fractional longitudinal sectional view of the same.

Fig. 14 is a detail view of a guiding device for the front portions of the torpedoes.

Figs. 15 and 16 are detailed views of interlocking rings on the ends of the torpedo supporting links.

Fig. 17 is a detail view of a modified bomb releasing mechanism.

Fig. 18 is a detail view of a cover for the bomb compartment.

My torpedo, in the embodiment shown in Figs. 1 to 6, represents a miniature airplane or glider, having an elongated streamlined body 1, and a pair of laterally extended wings, 2. In view of the fact that the torpedo at the moment of its release is already moving through space at the high speed of the aircraft, and that after release it must glide toward the ground in a more or less rapid descent, it follows that the relative wing span of my torpedo may be made considerably smaller than would be necessary to provide for an airplane which must take off from the ground. The over-all width of my torpedo can be reduced, therefore, so as to facilitate its storing in the fuselage of the airplane. It may be still further reduced by providing two sets of wings (biplane type). Approximate proportions of the wings for ordinary conditions are shown in Fig. 6. The wings are designed and proportioned in accordance with the weight of the torpedo, size of the body, spread of the airplane, and the desired angle of descent, or, in other words, the desired distance of its flight from a given point of elevation. Additional lifting surface may be provided by forming shoulders 6' and, is provided with an automatic stabilizing with grooves at the sides of the body 1.

The torpedo is entirely automatic in its flight and, is provided with an automatic stabilizing apparatus for maintaining lateral stability and for keeping the desired angle of incidence in gliding. For this purpose, are provided, elevators or horizontal rudders 3, mounted on shafts 4 and 4', journaled in bearings 5. The elevators are operated by a pendulum 6 shown in detail in Figs. 8, 9 and 10. The pendulum is suspended on bars 7 and 8 rotatively mounted on stub shafts 9 and 10 fitted in a block 11 on a shaft 12 which is supported in brackets 13. The bar 8 is attached to a bevel gear, 14, in mesh with bevel gears 15 and 16, rotatively mounted on the shaft 12, and provided with arms 17. The latter are pivotally connected at 18, to links 19, whose other ends are pivoted at 20, to arms 21, mounted on the inner ends of the shafts 4. A gear 22, is rotating on the shaft 9, and serves only to balance the pressure between the other gears. This arrangement forms a differential gearing permitting the pendulum to oscillate in all directions and at the same time providing for the proper operation of the elevators so as to correct lateral and longitudinal deviations of the torpedo in flight.

As may be seen from the drawings, the pendulum, if deflected longitudinally of the body 1, rotates both gears 9 and 10, in the same direction, thereby turning both elevators up or down thus correcting the angle of incidence of the torpedo in flight. A transverse inclination of the pendulum, caused by lateral rotation of the torpedo, will cause the gears 9 and 10 to rotate in opposite directions, thereby causing the elevators to turn so as to re-establish the correct stable lateral position of the wings. For retarding the oscillations of the pendulum, a dash-pot 7' is provided with a plunger 8' having rod 8" pivotally connected to the pendulum at 9'. The plunger has a small hole 10' for the passage of oil or air between the opposite sides of the plunger.

An arrangement is also provided for automatically maintaining my torpedo on its trajectory. This is accomplished by means of a vertical rudder 23, controlled by a gyroscope 24. The latter is mounted on a shaft 25, journaled in ball bearings 26, in a gimbal ring 27, rotatively supported in trunnion shafts 28 and 29. Bearings 30 and 31 for these shafts are mounted on the walls of the torpedo. The gyroscope controls the operation of an air motor which operates the rudder.

For this purpose, the shaft 29, has a bevel gear 32, in mesh with a bevel pinion 33, on a shaft 34, extending from a rotary valve 35, in a casing 35', at the side of an air cylinder 36. A piston 37, has a rod 38, pivotally connected at 39, to one end of a link 40, whose other end is pivoted at 41, to an arm keyed on a shaft 43, of the rudder 23. The piston is moved by compressed air which is delivered by an intake Pitot tube 44, directed against the air flow in flight (Fig. 7). The exhaust air is obtained by Pitot suction tubes 45, and 45', directed rearward in flight. As is shown in Fig. 7, the valve in one position admits the compressed air into the right side of the cylinder 36, through a port 46, and passages 47, and 48, in the valve. The left side of the cylinder is then connected with the Pitot suction tube 45, through passages 47', and 48' and port 46'. The operation is reversed when the valve is turned in the other direction from the neutral position. It should be noted that it is preferable to place the passages 47 and 47' at a small angle to the passages 48 and 48' in order to obtain the reversal of the piston for small angular movements of the valve or for small angles of rotation of the ring 27. With such an arrangement it is possible to obtain a very sensitive and effective control of the rudder with a relatively small gyroscope, this arrangement being therefore preferable to the direct connection of the gyroscope with the rudder. The axis of rotation or shaft 25 is supported horizontally or co-axially with the torpedo, the gimbal frame being also mounted on a horizontal axis transversely to the shaft 25. With such an arrangement of two axes of rotation any deviation to the left or right will cause the axis of gyroscope to turn in the vertical plane thereby causing rotation of the bevel gears 32 and 33.

In order to impart rotation to the gyroscope, the end of its shaft 25, is provided with a spool or pulley 49, on which a cord or cable 50, is wound, the end of the cord being held in place only by the subsequent turns so that the cord becomes free when unwound from the pulley. The cord passes from the pulley to an idler sheave, or pulley, 51, supported in a bracket 52, the end of the cord being attached to a weight 53, in a well 54, open at the bottom. The weight rests on a bar 55, slidably supported at the bottom of the well and provided with a cord or cable 56, extending to the outside of the torpedo for manual operation. By pulling on the cable, the bar is withdrawn from the well and the weight is allowed to fall out carrying the cord 50, with it, the cord rotating the shaft 25, with the gyroscope. It is important to spin the gyroscope in its correct operative position, and for this purpose the end of the shaft 25, is retained in the correct horizontal position by a bar 57, on the lower end of the bracket 52, resting against the ends of supports 58, attached to the walls of the body, when the cord 50, is under tension. The upper end of the bracket 52, is pivoted on a shaft 59, fitted in brackets 60, mounted under the top wall of the body 1. A retrieving spring 61, tends to raise the bracket with the pulley away from the supports, 58.

The bracket 52, is retained at a certain elevation by a shearing pin 65' passing through the body 1, and the bar 64, so that the bar 57, forms a clearance above the supports 58. This arrangement is provided in order to break the pin 65' when the weight 53, is released, permitting the bar 57, to settle on the supports 58, until the cord is completely unwound. The cord then falls away with the weight, releasing the bracket 52, which rises under action of the spring 61, thereby moving the bar 65, and releasing the hooks 67. The torpedo is then freed from its supports and falls away from the airplane to start its gliding flight under control of the gyroscope and pendulum.

Each plate 67, has a hook 69, at the end, engaging the opposite edge of the other plates so that the plates remain locked together until the torpedo falls away from the well, when the plates become separated, permitting the links to drop aside. The links pass through vertical slots 70, in the walls 68, of the well 68' and are pivotally attached to endless chains 71, mounted on sprockets 72 and 72'. Shafts 73 and 73' of the sprockets are interconnected by a chain 74, engaging sprockets 75, so that both chains 71, are moved at the same time when one of the shafts is rotated. The shaft 73' has a sprocket 76 with a chain 77, extending outside the well to a point where it can be manually operated as, for instance, by a handle on the end sprocket (not shown). The well is made sufficiently deep so that several torpedoes can be placed inside, one above the other suspended at proper distances on the links 66 from the chains. The angular arrangement of the links prevents the torpedoes from moving in lateral directions. To prevent their longitudinal movement, the noses of the torpedoes slide between vertical guiding plates 78, abutting the curved walls of the torpedoes beyond vanes 90, and spaced so that the vanes are prevented from rotation while being free to slide along the guides as shown in Fig. 14 in plan view. The tails of the torpedoes are guided by plates 79, entering between the ends of the wings and the front edges of the elevators where the slots 80, are formed.

For launching the torpedo it is lowered to the bottom of the well and the weight 53, is released by pulling on the cord 56, and removing the retaining bar 55. The cords 56, pass over pulleys 81, into the control cabin in the airplane, the pulleys being located at a sufficient distance from the torpedoes so as to be operative for different positions of the torpedoes in the well.

The front or middle portion of the body 1, has a number of cells 82, preferably inclined forward for bombs 83, which are retained in their positions by hinged doors 84. The doors are interlocked together so that each succeeding door is held in place by a cam 85, on the rear end of the preceding door as shown in Fig. 11. The front door is held by a hook 86, on the end of a lever 87, pivoted at 88, in a bracket 89. With this arrangement the bombs are successively released one after another, when the first door is opened by turning the hook, 86. A mechanism is provided for releasing the first bomb after the torpedo has reached its destination in flight. For this purpose, a vane 90, is provided of an ordinary type, such as are used for arming aerial torpedoes in front mounted on the end of a shaft 91, as shown in Figs. 1 and 11. The other end of the shaft has a worm 92, in mesh with a worm gear 93, on a vertical shaft 94, journaled on a bracket 95, and having a worm 96, in mesh with a worm gear, 97. The latter is mounted on a first wheel of a revolution counter 98, on a shaft 99, supported in a bracket, 100. The last wheel of the counter is connected by a shaft 101, with a sliding coupling 102, on the end of a screw 103, threaded in the end of the lever, 87. The counter is made so that when the wheels reach the last position indicated by the figures 999 . . ., they will be locked together and the screw 103 will turn at the same speed as the gear 97, moving the lever and releasing the first door 84. The counter can be removed for setting the wheels for the desired distance of flight by shifting the assembly to the right against the tension of a spring 104, thereby releasing the end of the shaft 101, from the coupling 102. The counter can be then removed from the body 1, through a suitable opening (not shown).

The bombs 83, may be of any suitable type, high explosive, shrapnel, or incendiary, provided if desired with gliding tail plates, 105. The latter may be curved in different directions in order to cause the bombs to fly in different directions so as to scatter over a more or less wide area.

In order to destroy my torpedo carrier when the last bomb has been discharged from it, the torpedo is provided with a charge of an explosive material 109, which is exploded by a detonator 108, with a fulminate 118, when it is struck by a firing pin 107. The latter is placed under tension by a spring 106, but is prevented from operation by a retaining or locking pin 119 at one side and by a sliding pin 120, at the other side. The locking pin 119, extends to the outside of the carrier and may be withdrawn when the carrier is fully charged with bombs and placed in position in the airplane or even when the carrier is about to be released. The sliding pin 120, represents a screw threaded in a bracket 121, and having a small pulley 122, for a cord supporting a weight, 123. The latter rests on a bar 124, held by a lug or extension on the last door, 84'. The bar 124, is released when the last bomb falls down together with the last door 84', the bar and the weight 123, falling then through a hole, 126. The cord, rotating the pulley 122, finally releases the firing pin which explodes the charge, 109. This arrangement is provided in order to delay the explosion of the carrier until the last bomb had a chance to drop away and to do its work as otherwise it might be destroyed by the explosion of the torpedo.

A modified construction of the door opening mechanism is shown in Figs. 17 and 18. Each door 110, is provided with ribs 111, for guiding the nose of the bomb when the door is opened, the rear end of the door having a hook 112, engaging a shaft 113, when the door is closed, but permitting the door to fall away when opened so as not to obstruct the flight of the next released bomb. The shafts 113, have gear sectors, 112, with cams 115, engaging the end points of the ribs 111, the sectors being engaged by worms 116, on a shaft 117, operated by the counter 98. The sectors and cams are set differently at successively increasing angles so that the doors are released one after another after predetermined periods of time. The doors upon their release fall away so that they do not interfere with the release of the bombs.

It is understood that the described embodiment represents only an example of a construction in accordance with my invention, and it may be further modified in various mechanical arrangements and details within the scope of the appended claims.

I claim as my invention:

1. An aerial torpedo comprising an elongated body with laterally extended wings adapted to support the body in a gliding descent when released from an airplane, the body being provided with a plurality of cells for bombs, hinged first cover for the cells adapted to support the bombs, air operated means for measuring distance of flight of the torpedo, means to open the covers by the distance measuring means and means to successively open the covers by the opening of the first cover.

2. An aerial torpedo comprising an elongated body with laterally extended wings adapted to support the body in a gliding descent when released from an airplane, the body being provided with a plurality of cells for bombs, hinged covers for the cells adapted to support the bombs, means to lock the covers in the closed position, a vane on the body adapted to be rotated by air when the torpedo is in flight, a revolution counter operatively connected with the vane, means to release the covers by the counter for releasing the bombs one at a time upon completion by the counter of a predetermined number of revolutions, a charge of an explosive material in the body, means to explode the charge, means to render the exploding means inoperative, and means to release the exploding means by the last released cover.

3. An aerial torpedo comprising an elongated body with laterally extending wings adapted to support the body in a gliding descent when released from an aircraft, individual cells in the body for aerial bombs, a distance-indicating device in the body, means to release the first bomb by the distance-indicating device upon completion of a predetermined distance of flight, and means to successively release every bomb one after another, by the release of the first bomb.

4. An aerial torpedo comprising an elongated body with laterally extending wings adapted to support the body in a gliding descent when released from an aircraft, the body being provided with a plurality of cells for bombs, hinged covers for the cells adapted to support the bombs, means to lock the covers in the closed position, a vane at the front end of the body adapted to be rotated by wind when the torpedo is in flight, a revolution counter operatively connected with the vane, means to successively release the bombs upon completion of a predetermined number of revolutions by the counter, a charge of explosives in the body, a yieldable means to explode the charge means to render the exploding means inoperative, means to release the exploding means by the release of the last bomb, and means to delay the explosion until the last bomb falls away.

5. An aerial torpedo comprising an elongated body having supporting surfaces for maintaining the body in a gliding descent upon release from an airplane, a plurality of downward and forward extending partitions in the body forming cells for bombs, covers removably supported at the lower ends of the cells for retaining the bombs in the cells, a vane rotatively supported in the body adapted to be rotated by the air pressure when the body is in flight, means operated by the vane for releasing the first cover at the completion of a predetermined number of revolutions by the vane, and means to successively release the other covers by the release of the first cover.

LEONID A. DUNAJEFF.